(12) United States Patent
Pfitzner

(10) Patent No.: US 11,899,558 B2
(45) Date of Patent: Feb. 13, 2024

(54) SYSTEMS AND METHODS FOR OPTIMIZING HARD DRIVE THROUGHPUT

(71) Applicant: Netflix, Inc., Los Gatos, CA (US)

(72) Inventor: David W. Pfitzner, St Peters (AU)

(73) Assignee: Netflix, Inc., Los Gatos, CA (US)

( * ) Notice: Subject to any disclaimer, the term of this patent is extended or adjusted under 35 U.S.C. 154(b) by 253 days.

(21) Appl. No.: 17/150,507

(22) Filed: Jan. 15, 2021

(65) Prior Publication Data
US 2022/0229761 A1 Jul. 21, 2022

(51) Int. Cl.
*G06F 11/34* (2006.01)
*G06F 11/22* (2006.01)
*G06F 11/30* (2006.01)

(52) U.S. Cl.
CPC ...... *G06F 11/3485* (2013.01); *G06F 11/2294* (2013.01); *G06F 11/3058* (2013.01); *G06F 11/3419* (2013.01)

(58) Field of Classification Search
None
See application file for complete search history.

(56) References Cited

U.S. PATENT DOCUMENTS

| | | | | |
|---|---|---|---|---|
| 6,015,348 A * | 1/2000 | Lambright | ............ | A63F 13/12 463/29 |
| 9,063,939 B2 * | 6/2015 | Dalton | .............. | G06F 16/119 |
| 9,069,616 B2 * | 6/2015 | Kadatch | ............. | G06F 3/0659 |
| 9,395,920 B2 * | 7/2016 | Deng | ................. | G06F 3/0676 |
| 9,503,517 B1 * | 11/2016 | Brooker | ............... | G06F 3/0631 |
| 9,776,091 B1 * | 10/2017 | Lebrun | ................. | A63F 13/35 |
| 9,804,993 B1 * | 10/2017 | Brooker | ............. | G06F 11/3433 |
| 9,823,840 B1 * | 11/2017 | Brooker | ................ | G06F 3/0631 |
| 10,430,102 B2 * | 10/2019 | Kaczmarczyk | ..... | G06F 11/1469 |
| 10,695,677 B2 * | 6/2020 | Lebrun | ................. | A63F 13/358 |
| 10,901,825 B2 * | 1/2021 | Greco | .................. | G06F 3/0682 |

(Continued)

OTHER PUBLICATIONS

Wang, Ji, et al. "An attention-augmented deep architecture for hard drive status monitoring in large-scale storage systems." ACM Transactions on Storage (TOS) 15.3 (2019): 1-26. (Year: 2019).*

(Continued)

*Primary Examiner* — Matthew J Brophy
(74) *Attorney, Agent, or Firm* — Greenberg Traurig, LLP

(57) ABSTRACT

The disclosed computer-implemented method includes accessing a hard drive to measure operational characteristics of the hard drive. The method next includes deriving hard drive health factors used to control the hard drive that are based on the measured operational characteristics. The derived hard drive health factors include an average per-seek time indicating an average amount of time the hard drive spends seeking specified data that is to be read and an average read speed indicating an average amount of time the hard drive spends reading the specified data. The method next includes determining, based on the hard drive health factors and the operational characteristics, an amount of load servicing capacity currently available at the hard drive, and then includes regulating the amount of load servicing performed by the hard drive according to the determined amount of available load servicing capacity. Various other methods, systems, and computer-readable media are also disclosed.

20 Claims, 7 Drawing Sheets

(56) References Cited

U.S. PATENT DOCUMENTS

| | | | |
|---|---|---|---|
| 11,318,390 B2* | 5/2022 | Lebrun | A63F 13/77 |
| 11,379,354 B1* | 7/2022 | Brooker | G06F 12/02 |
| 2007/0244827 A1* | 10/2007 | Candelore | G11B 20/00188 |
| 2013/0081014 A1* | 3/2013 | Kadatch | G06F 9/5027 |
| | | | 718/1 |
| 2013/0117225 A1* | 5/2013 | Dalton | G06F 16/119 |
| | | | 707/623 |
| 2013/0132057 A1* | 5/2013 | Deng | G06F 11/3433 |
| | | | 703/21 |
| 2015/0234716 A1* | 8/2015 | Brooker | G06F 12/02 |
| | | | 714/47.1 |
| 2016/0259569 A1* | 9/2016 | Povzner | G06F 13/102 |
| 2017/0131934 A1* | 5/2017 | Kaczmarczyk | G06F 3/061 |
| 2017/0147425 A1* | 5/2017 | Waheed | G06F 11/2094 |
| 2017/0235485 A1* | 8/2017 | Davis | G06F 3/0631 |
| | | | 711/113 |
| 2018/0065048 A1* | 3/2018 | Lebrun | A63F 13/34 |
| 2020/0142788 A1* | 5/2020 | Hu | G06F 9/5077 |
| 2020/0251143 A1* | 8/2020 | Nangare | G06F 3/0619 |
| 2020/0391119 A1* | 12/2020 | Lebrun | A63F 13/35 |

OTHER PUBLICATIONS

Wang, Zhan, et al. "Disk storage isolation and verification in cloud." 2012 IEEE Global Communications Conference (GLOBECOM). IEEE, 2012. (Year: 2012).*

International Search Report and Written Opinion received for PCT Application Serial No. PCT/US2022/012366 dated May 9, 2022, 11 pages.

* cited by examiner

SYSTEMS AND METHODS FOR OPTIMIZING HARD DRIVE THROUGHPUT

BACKGROUND

Despite advances in solid state drive (SSD) technology, hard drives are still widely used to store digital data. The technology and components used in these hard drives has also advanced over the years. For example, hard drives have continued to grow in storage size, while dropping in cost. As such, hard drives are still a go-to choice for storing large amounts of digital data.

While hard drives are still widely used in industry, hard drives may become overloaded by high read or write demands. Hard drives are, after all, mechanical devices that spin a storage platter at high RPMs and attempt to read data from increasingly smaller magnetic regions that hold the ones and zeros that make up the stored digital data. Finite limits exist on how quickly data can be read from the drive based on a variety of factors, including where the data is stored on the platter, whether the data is fragmented or broken up, and how fast the platter is spinning.

SUMMARY

As will be described in greater detail below, the present disclosure describes methods and systems for regulating hard drive load servicing according to alternative hard drive health factors. Because hard drives often become overloaded due to high read or write demands, the embodiments herein are designed to regulate the amount of load servicing any one hard drive performs according to health factors that are not considered by traditional hard drive monitoring systems.

In one example, a computer-implemented method for regulating hard drive load servicing according to hard drive health factors is provided. This method includes accessing a hard drive to measure operational characteristics of the hard drive. The method next includes deriving hard drive health factors used to control the hard drive that are based on the measured operational characteristics. The derived hard drive health factors include an average per-seek time indicating an average amount of time the hard drive spends seeking specified data that is to be read and an average read speed indicating an average amount of time the hard drive spends reading the specified data. The method next includes determining, based on the derived hard drive health factors and the measured operational characteristics, an amount of load servicing capacity currently available at the hard drive. The method then includes regulating the amount of load servicing performed by the hard drive according to the determined amount of available load servicing capacity.

In some cases, the operational characteristics of the hard drive include input/output operations per second (IOPS) read from the hard drive or megabytes per second (MBPS) read from the hard drive. In some examples, determining, based on the derived hard drive health factors and the measured operational characteristics, an amount of load servicing capacity currently available at the hard drive further includes calculating a combined hard drive health factor that comprises the product of the IOPS and the average per-seek time added to the MBPS read divided by the average read speed.

In some examples, the step of determining, based on the derived hard drive health factors and the measured operational characteristics, an amount of load servicing capacity currently available at the hard drive further includes: identifying a service time limit that is to be maintained by the hard drive, and dynamically adjusting the determined amount of load servicing capacity to maintain the identified service time limit. In some cases, determining, based on the derived hard drive health factors and the measured operational characteristics, an amount of load servicing capacity currently available at the hard drive further includes: calculating a combined hard drive health factor that comprises the product of the IOPS and the average per-seek time added to the MBPS read divided by the average read speed, estimating a target value for the combined hard drive health factor, and calculating a scaled hard drive health factor that divides the combined hard drive health factor by the estimated target value for the first combined hard drive health factor.

In some embodiments, regulating the amount of load servicing performed by the hard drive according to the determined amount of available load servicing capacity further includes regulating the amount of load servicing performed by the hard drive according to the calculated scaled hard drive health factor. In some cases, the method further includes establishing respective limits for the calculated combined hard drive health factor and the calculated scaled hard drive health factor. In some examples, the respective limits for the calculated combined hard drive health factor and the calculated scaled hard drive health factor include dynamic limits subject to change based on one or more factors.

In some cases, data stored on the hard drive is stored in specified locations on the hard drive, and the amount of load servicing capacity currently available at the hard drive is further determined based on the location of the stored data. In some embodiments, more frequently accessed data is stored on an outer portion of the hard drive, and less frequently accessed data is stored on an inner portion of the hard drive.

In some examples, the method further includes determining how much data stored on the hard drive is served from the outer portion of the drive and determining how much data stored on the hard drive is served from the inner portion of the drive. In some cases, data stored on the inner portion of the hard drive is moved to the outer portion of the hard drive upon determining that at least a portion of the data stored on the inner portion of the hard drive is being accessed more frequently than at least a portion of the data stored on the outer portion of the hard drive. In some examples, the average per-seek time and/or the average read time are further derived according to where on the hard drive the specified data is stored.

In some embodiments, a system is provided that includes: at least one physical processor, and physical memory comprising computer-executable instructions that, when executed by the physical processor, cause the physical processor to: access a hard drive to measure operational characteristics of the hard drive. The physical processor then derives hard drive health factors used to control the hard drive that are based on the measured operational characteristics. The derived hard drive health factors include an average per-seek time indicating an average amount of time the hard drive spends seeking specified data that is to be read and an average read speed indicating an average amount of time the hard drive spends reading the specified data. The physical processor then determines, based on the derived hard drive health factors and the measured operational characteristics, an amount of load servicing capacity currently available at the hard drive, and regulates the amount of load servicing performed by the hard drive according to the determined amount of available load servicing capacity.

In some examples, the hard drive is part of a cluster of hard drives serving media content over a computer network. In some cases, the cluster of hard drives serving media content over the computer network is configured to receive and handle multiple simultaneous data read requests. In some embodiments, the determined amount of load servicing capacity currently available at the hard drive indicates whether hard drives should be added to or removed from the cluster of hard drives. In some cases, the cluster of hard drives includes a virtual cluster of hard drives that allows a variable number of hard drives to be operational at a given time. In such cases, one or more hard drives are automatically removed from or added to the virtual cluster according to the indication of whether the hard drives should be added to or removed from the virtual cluster of hard drives. In some cases, the hard drives are added to or removed from the cluster of hard drives in order to maintain a specified service time limit.

In some embodiments, a non-transitory computer-readable medium is provided that includes computer-executable instructions that, when executed by a processor of a computing device, cause the computing device to: access a hard drive to measure operational characteristics of the hard drive and derive hard drive health factors used to control the hard drive that are based on the measured operational characteristics. The derived hard drive health factors include an average per-seek time indicating an average amount of time the hard drive spends seeking specified data that is to be read and an average read speed indicating an average amount of time the hard drive spends reading the specified data. The computing device then determines, based on the derived hard drive health factors and the measured operational characteristics, an amount of load servicing capacity currently available at the hard drive, and regulates the amount of load servicing performed by the hard drive according to the determined amount of available load servicing capacity.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
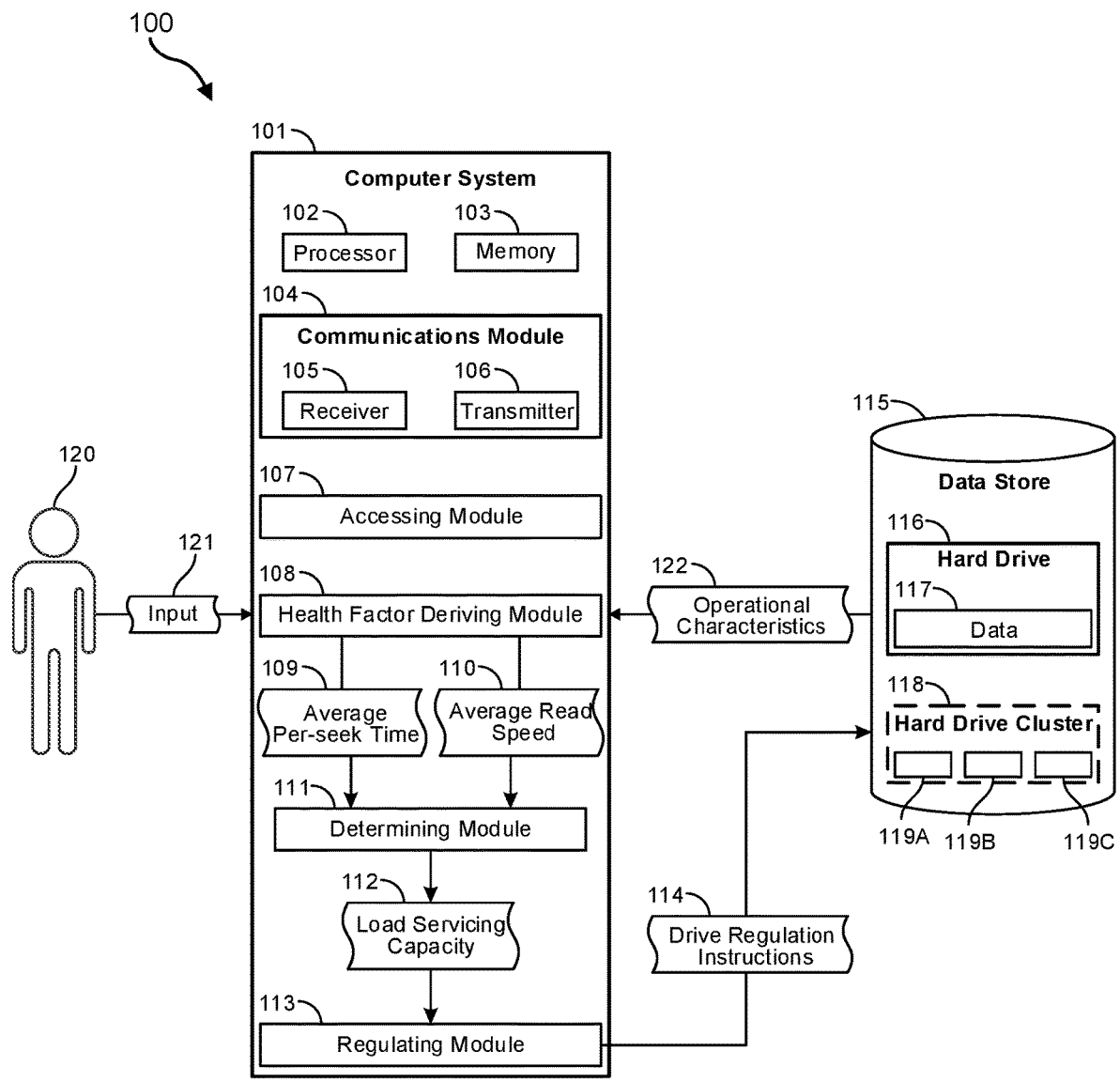
FIG. 1 illustrates a computing environment in which hard drive load servicing is regulated according to hard drive health factors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to regulating hard drive load servicing according to specific hard drive health factors. Digital data is often stored in large clusters of hard drives. For example, videos, movies, songs, and other types of digital media is often stored in the cloud and is streamed to end devices over the internet. This digital data is typically stored in clusters of hard drives. These hard drive clusters may include many tens, hundreds, or thousands of different hard drives that collectively store the digital data. In traditional systems, each of these hard drives may be individually monitored to ensure that they are each functioning properly. Traditional hard drive monitoring systems have established different health factors to assist in determining whether each hard drive is working optimally. These traditional hard drive health factors, however, as will be shown, have a number of shortcomings.

"MBPSRead" is a hard drive health factor that describes hard drive read throughput in megabytes per second. This indicates, for instance, how much data is being read each second by the hard drive. "IOPSRead" describes the number of read I/O operations performed by the hard drive each second. The "QueueLength" health factor describes the number of queued read requests to the drive. Thus, for example, if a hard drive has a very high number of queued read requests, the amount of time before each incoming read request is serviced is increased. A "ServiceTime" health factor describes the average duration (e.g., in milliseconds) for read requests to be serviced by the drive, and a "BusyPct" health factor describes the percentage of time that the drive is "busy" (i.e., the drive has a read in progress).

One of the downsides of the QueueLength and ServiceTime health factors is that they tend to have a very non-linear response with respect to the level of incoming requests, which causes the hard drive's health proportional-integral-derivative (PID) controller to behave poorly. For instance, if either of these hard drive health factors becomes a limiting factor (i.e., a factor that would limit how much data or how fast data can be read from or written to the hard drive), the hard drive is likely already heavily overworked.

Indeed, these health factors are typically used only as "back-stop" limits. In most cases, hard drive management systems that monitor and operate the hard drives would establish limits based on other health factors first. Then, if those limits are reached, the hard drive management system may indicate that a failure has occurred and that the hard drive is to have its load servicing capacity reduced.

The term "load servicing capacity," as used herein, refers to a hard drive's ability to perform read and/or write requests (i.e., the ability to service a read or write request). A high load servicing capacity indicates that the hard drive is capable of handling an increased request load, while a low load servicing capacity indicates that the hard drive is at or nearly at its limit and cannot handle additional load. In some cases, a hard drive may have additional load servicing capacity even though some health factors, such as the BusyPct health factor, indicate that the hard drive is at capacity. In some cases, for example, BusyPct is problematic as a health factor in that a hard drive that is "100% busy" might actually be able to serve more data traffic. For instance, if the data traffic is increased, the average queue length will be correspondingly increased, which may increase hard drive response time (i.e., latency). In some embodiments, in order to reduce latency, read requests are reordered in a more efficient manner based on where data is stored on the hard drive. Accordingly, in such cases reads from the same physical portion of the hard drive are reordered and grouped together. This grouping allows a hard drive that is operating at 100% capacity (according to the BusyPct health factor) to actually accommodate an increased number of reads with shorter seeks. As such, the BusyPct health factor is often not indicative of a hard drive's true ability to service additional load.

Still further, the MBPSRead health factor is often used as a limiting factor for traditional cloud-based clusters that are limited by the performance of their hard drives. The MBPSRead health factor, however, may suffer from the problem that the appropriate limit value depends on conditions on the cloud-based cluster, which can vary for different clusters, and can vary at different times. In particular, the appropriate MBPSRead limit depends on the average read size, and on the effectiveness of content placement. The IOPSRead health factor has the same problem, as its appropriate limit value also depends on the same conditions, although with different details. For instance, for larger data reads, the hard drive spends relatively less time seeking (moving the read head), and more time actually reading, so it reaches its limit at higher MBPSRead and lower IOPSRead, compared to the same drive with smaller reads. The average read size, in turn, is affected by different factors, such as the read-ahead settings on the cloud-based cluster, the client mix, and the network conditions between the cloud-based cluster and its clients (since the network conditions can affect the distribution of bitrates requested by the clients).

Content placement also affects these traditional MBPSRead and IOPSRead health factors. As used herein, the term "content placement" refers to placing more popular content on the outer part of the hard drive platter, so that it is more quickly accessible. Because the linear speed of a hard drive's platter is proportional to the radius on the platter, the linear speed will be smaller for the inner portion of the platter than for the outer portion as the platter moves under the read head. If content is placed effectively, a large fraction of traffic will then be served from the outer part of the drive, providing the hard drive with higher MBPSRead and higher IOPSRead measurements, compared to the same conditions with less effective content placement on the inner part of the drive. The effectiveness of content placement varies on different cloud-based clusters, depending on factors including which content is served from solid state drives or cache memory, and how popular the data is. As such, limiting hard drive health based on MBPSRead falls short of ideal, because the appropriate limit value varies dynamically depending on the conditions. Using IOPSRead as the main limit or health factor would lead to the same issues. The hard drive health factors described herein below aim to address, at least in part, the shortcomings associated with these traditional hard drive health factors.

The following will provide, with reference to FIGS. 1-7, detailed descriptions of how hard drive load servicing is regulated according to the more accurate, alternative hard drive health factors described herein. FIG. 1, for example, illustrates a computing environment 100 in which hard drive load servicing may be regulated according to alternative hard drive health factors. FIG. 1 includes various electronic components and elements including a computer system 101 that is used, either alone or in combination with other computer systems, to perform various tasks. The computer system 101 may be substantially any type of computer system including a local computer system or a distributed (e.g., cloud) computer system. The computer system 101 includes at least one processor 102 and at least some system memory 103. The computer system 101 includes program modules for performing a variety of different functions. The program modules are hardware-based, software-based, or include a combination of hardware and software. Each program module uses computing hardware and/or software to perform specified functions, including those described herein below.

For example, the communications module 104 is configured to communicate with other computer systems. At least in some embodiments, the communications module 104 includes substantially any wired or wireless communication means that can receive and/or transmit data to or from other computer systems. These communication means include hardware radios such as, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 interacts with databases, mobile computing devices (such as mobile phones or tablets), embedded devices, or other types of computing systems.

The computer system 101 further includes an accessing module 107. In at least some embodiments, the accessing module 107 is configured to access hard drive 116 in data store 115. The hard drive 116 may be part of a hard drive cluster (e.g., 118), or may operate by itself. In some cases, the hard drive cluster 118 (including hard drives 119A, 119B, and/or 119C) is a physical cluster that includes all of the hard drives that are physically connected to the data store 115. In other cases, the hard drive cluster 118 is a virtual cluster of hard drives that includes an assigned group of hard drives of substantially any size or configuration. Each hard drive in the cluster stores digital data 117. The hard drive 116 stores the data either sequentially or in a fragmented manner. Alternatively, the data 117 may be distributed over multiple hard drives and potentially over multiple locations. In some cases, the data is distributed according to RAID patterns (e.g., RAID 0, RAID 1, etc.) or according to any other data redundancy schemes.

The accessing module 107 thus accesses hard drive 116 to access data 117 and/or to access operational characteristics 122. In some cases, these operational characteristics 122 include empirical outputs such as the number of megabytes per second (MBPS) being read from the hard drive, or the number of input/output operations per second (IOPS). These measurements are performed by the operating system and roughly indicate how much data is being read from or written to the hard drive 116. As noted above, however, these indicators or other operational characteristics 122 do not provide a full picture of how well the hard drive 116 is operating. In some cases, for example, the digital data 117 is stored on different parts of the hard drive. Indeed, any given data file may be stored on the outer portion of the hard drive platter, in the middle of the platter, or in the inner portion of the hard drive platter. Because the hard drive is spinning, and because the hard drive read head may need to be physically moved prior to a data read, a finite amount of time will pass before the read head seeks to the proper position and before the spinning platter spins to the proper location where the data can be read. Accordingly, the embodiments described herein go beyond merely looking at the MBPS reading, the IOPS reading, or other operational characteristics, and take data storage location and other factors into consideration.

The health factor deriving module 108 of computer system 101 is configured to derive or calculate hard drive health factors based on one or more of the operational characteristics 122 monitored on the hard drive 116. In some cases, for instance, the health factor deriving module 108 is configured to derive an average per-seek time 109, along with an average read speed 110. These health factors, as will be explained further below, are used to generate a combined hard drive health factor (e.g., 305 of FIG. 3) that provides a more comprehensive and accurate indication of how well the hard drive 116 is operating, and whether the hard drive 116 has any excess load servicing capacity that is currently underutilized. The health factor deriving module 108 is also configured to derive a scaled hard drive health factor (e.g., 503 of FIG. 5), along with potentially other health factors.

Once these health factors have been derived based on the operational characteristics 122, the determining module 111 of computer system 101 uses the average per-seek time 109 and/or the average read speed 110 to determine the current load servicing capacity 112 of the hard drive 116. In some cases, the determining module 111 will interpret the average per-seek time 109 and/or the average read speed 110 to indicate that the hard drive 116 has a very low load servicing capacity 112, indicating that the hard drive is already servicing as much data load as it can. In other cases, the determining module 111 will interpret the average per-seek time 109 and/or the average read speed 110 to indicate that the hard drive 116 has a very high load servicing capacity 112, indicating that the hard drive has some excess capacity and could service additional data read or write loads.

Upon determining the current load servicing capacity 112 for the hard drive, the regulating module 113 of computer system 101 then generates and issues drive regulation instructions 114 to the hard drive 116 or to another component or functionality module. For example, in some cases, the drive regulation instructions 114 are sent to a control plane component that is responsible for influencing how much load ends up on a given hard drive. Indeed, in some cases, these drive regulation instructions are issued to a control plane component of an underlying distribution infrastructure that is responsible for steering requests to specific end nodes within a data store. These instructions may apply to the hard drive 116 by itself, or apply to all of the drives in the hard drive cluster 118 (of which the hard drive 116 may or may not be a member). These hard drive regulation instructions 114 indicate that the hard drive 116 is to take on additional load servicing, or is to offload some of its load servicing, or is to maintain its current level of load servicing. In some cases, the hard drive regulation instructions further specify by how much the load servicing is to be increased or decreased (e.g., decrease reading data by N number of MBPS, or increase data reading operations by N IOPS). These embodiments will be explained further below with regard to method 200 of FIG. 2, and with regard to the embodiments of FIGS. 3-7.

Figure 2:
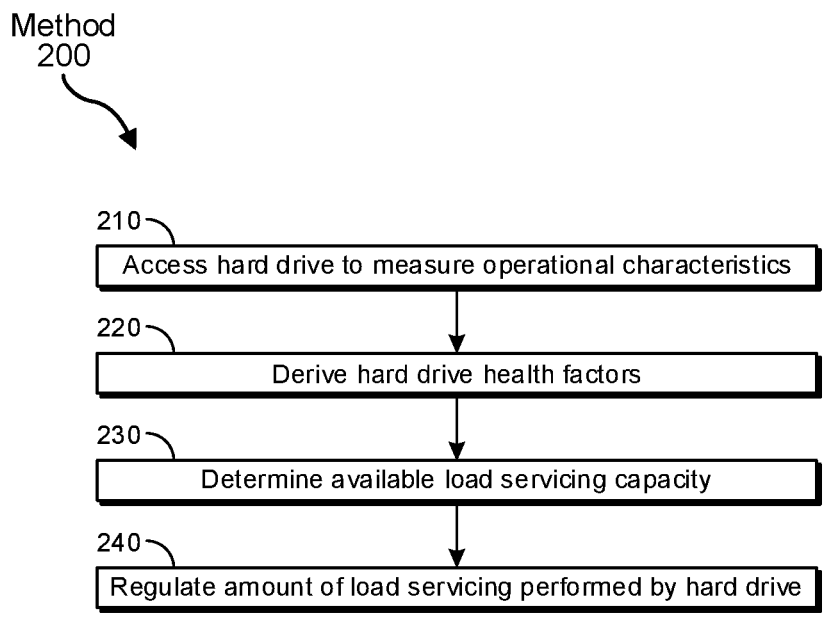
FIG. 2 is a flow diagram of an exemplary method for regulating hard drive load servicing according to hard drive health factors.

FIG. 2 is a flow diagram of an exemplary computer-implemented method 200 for regulating hard drive load servicing according to specific hard drive health factors. The steps shown in FIG. 2 may be performed by any suitable computer-executable code and/or computing system, including the system illustrated in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein accesses at least one hard drive to measure one or more operational characteristics of the hard drive. At step 220, the systems described herein derive one or more hard drive health factors used to control the hard drive that are based on the measured operational characteristics. The derived hard drive health factors include an average per-seek time indicating an average amount of time the hard drive spends seeking specified data that is to be read and an average read speed indicating an average amount of time the hard drive spends reading the specified data. The systems then determine, at step 230, based on the derived hard drive health factors and the measured operational characteristics, an amount of load servicing capacity currently available at the hard drive and, at step 240, regulate the amount of load servicing performed by the hard drive according to the determined amount of available load servicing capacity.

Thus, in method 200, the systems herein are designed to regulate the amount of load servicing performed by a hard drive according to a determined amount of available load servicing capacity. In at least some cases, the systems are generally seeking to know the average read speed and the average seek time for the current conditions. The average read speed and the average seek time are then used to calculate HDDCombined. The average read speed and average seek time are, at least in some embodiments, not obtained directly. The systems know what time they issued a request to a hard drive, and when the request completed, with the difference being the service time. The systems do not know how much of that time was spent waiting for other requests, how much time was spent moving the read head, and how much was spent actually reading the data. Instead, the systems calculate the average read speed and average seek time based on information that they do know. At least some of the things that the systems do know are: for each piece of content, approximately where that content is stored on disk, for each piece of content, how frequently the content is requested (based on past requests), and saved experimental data of read speeds and average seek times for content at known locations on the hard disk. The systems described herein may also use a geometric model, which provides mathematical formulae describing how to combine all of the above data to calculate the estimated average read speed and the average seek time. This will be described further below with regard to FIG. 3.

Figure 3:
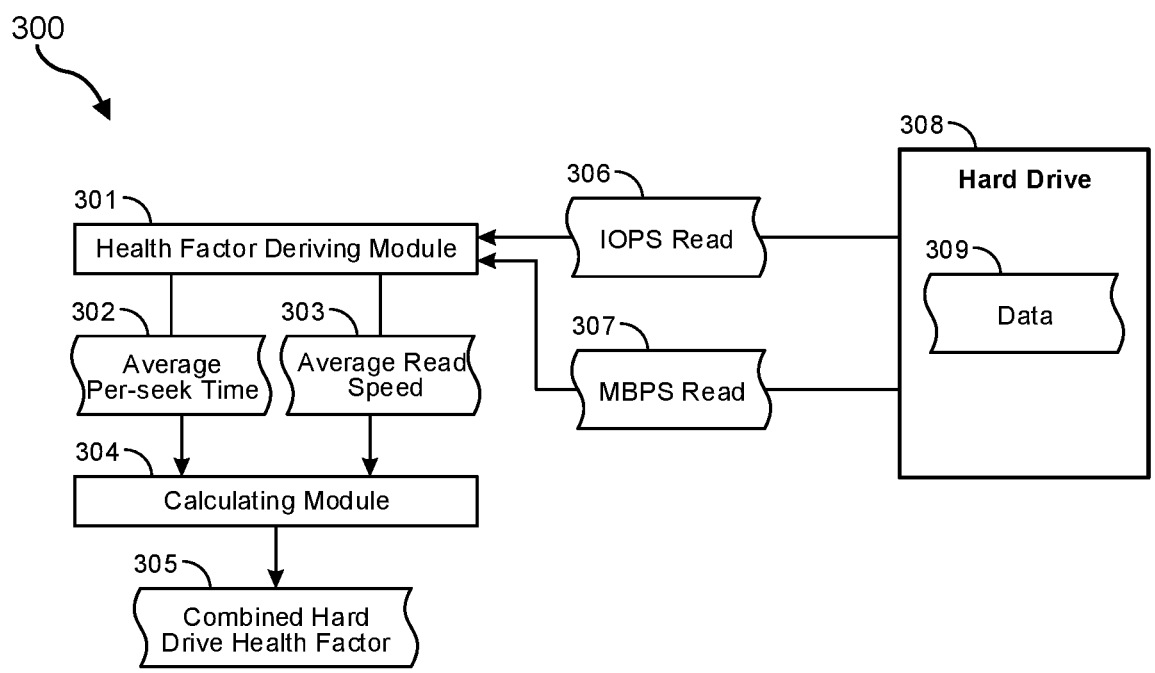
FIG. 3 illustrates a computing environment in which a combined hard drive health factor is derived.

FIG. 3 illustrates a computing environment 300 in which specific operational characteristics (e.g., 122 of FIG. 1) are implemented to derive alternative hard drive health factors including a combined hard drive health factor 305. For example, the health factor deriving module 301 is configured to access IOPSRead 306 and/or MBPSRead 307 indicating the number of input/output operations performed each second by the hard drive 308 and the number of megabytes of data 309 read from the hard drive 308 each second, respectively. These operational characteristics may be used alone or in combination with other operational characteristics when deriving the alternative hard drive health factors. The health factor deriving module 301 is configured to derive an average per-seek time 302 and/or an average read speed 303, which are then used by the calculating module 304 to calculate or generate a combined hard drive health factor 305. That combined hard drive health factor is then used to regulate load servicing on the hard drive 308.

At least in some cases, the health factor deriving module 301 derives the average read speed 303 based on artificial read load experimental data. Indeed, for each hard drive model, artificial read load experiments are performed to measure the bulk read speed for the innermost and outermost tracks on the hard drive platter. Additionally or alternatively, the health factor deriving module 301 accesses or determines the popularity of the data 309 on each hard drive 308. The popularity indicates how often the data is requested or read from the hard drive. On active servers that are serving data to clients (e.g., streaming multimedia content), the health factor deriving module 301 accesses local popularity data (in some cases, within a sliding timescale N number of minutes long (e.g., 60 min.)) to estimate the fraction of data traffic (i.e., load) serviced from the outer half of the hard drive 308, and the fraction of data traffic served from the inner half of the disk. The health factor deriving module 301 then combines these estimates with the operational characteristics IOPSRead 306 and MBPSRead 307 and a geometric model to estimate the weighted average bulk read speed. This estimated average read speed 303 takes into account the location of the content on each hard drive. Thus, while traditional hard drive health factors look only at the empirical IOPSRead and MBPSRead measurements, the alternative hard drive factors described herein identify where the content is placed on the hard drive using popularity as an indicator, along with a geometric model that provides the mathematical formulas used to determine the data's location on the platter, to generate an average read speed for the hard drive 308.

Furthermore, the health factor deriving module 301 derives the average per-seek time 302 using IOPSRead 306, MBPSRead 307, or other operational characteristics. For example, the health factor deriving module 301 uses the estimated fraction of traffic served from the outer half of the disk and combines that estimate with a geometric model and measured drive parameters (e.g., 306 & 307) to estimate the average seek time, taking into account content placement on the disk. Determining the average per-seek time 302 involves making at least one further adjustment as, empirically, the seek time varies depending on the number of concurrent reads being performed on the hard drive 308. In some cases, the seek time varies because a higher number of concurrent reads provides a larger number of opportunities to re-order the reads into a more efficient read order. For example, if multiple concurrent reads are received for data stored on different parts of the disk, those read requests received for the same part of the disk may be rearranged to order the reads so that reads from one part of the disk are performed as a group before moving the read head to read data from another part of the disk.

In some cases, the amount of variance in the seek time due to concurrent reads and reordering is identified using experimental data that shows, for each type of hard drive, what effect reordering has on seek time. In such cases, the health factor deriving module 301 calculates a maximum number of concurrent, parallel reads at which the hard drive will be at "effective saturation." This maximum number of concurrent reads is calculated based on a specified service time limit. The specified service time limit represents a threshold amount of time spanning from the time a read request was received until the time the read request was serviced. This threshold amount of time includes any delays in queuing the read request. The average per-seek time 302 thus takes into account and adjusts for efficiencies that may come with reordering concurrent reads that allow the data to be accessed and read more quickly from the disk. These efficiencies themselves, however, are tempered by the specified service time limit, so that concurrent reads are not reordered so many times that the effective delay degrades the quality of service by extending the read time past the specified service time limit.

After the health factor deriving module 301 has derived the average per-seek time 302 and/or the average read speed 303 for the hard drive 308, the calculating module 304 calculates a combined hard drive health factor 305 that is the product of the IOPS and the average per-seek time added to the MBPS read divided by the average read speed (e.g., HDDCombined=(IOPSRead*per_seek_time)+(MBPSRead/read_speed)). At least in some cases, this HDDCombined value represents a time budget for the hard drive, adding up the time spent seeking, and the time spent actually reading data. This HDDCombined value (i.e., the combined hard drive health factor 305) reaches a threshold load servicing value (e.g., a value of one on a scale of 0-1) when the hard drive 308 is effectively saturated. Because the value of one is, in this example, equivalent to the point of saturation at which the hard drive 308 cannot serve data any faster, the maximum limit for HDDCombined may be set at less than one to provide at least some headroom for hard drive health controllers (e.g., proportional-integral-derivative (PID) controllers) to regulate load on the hard drive to preserve the hard drive's health. In at least one example, a maximum threshold limit value for HDDCombined is set at 0.9. This value allows the hard drive 308 to operate at near maximum capacity, while still allowing the PID health controller to intervene when needed to maintain a minimum quality of service when providing data to data requestors.

In some cases, determining the appropriate amount of load servicing capacity for a given hard drive includes identifying a service time limit that is to be maintained by the hard drive. As noted above, hard drives may read and write data in response to incoming requests. In some cases, those read requests come from users who are requesting streaming media. In such cases, the streaming media provider may wish to provide a minimum quality of service (QoS) to the user. Thus, the hard drive may be operated in a manner that reads or writes data fast enough to maintain that minimum QoS. When determining the appropriate amount of load servicing capacity for a given hard drive, that minimum QoS or service time limit that is to be maintained may be used as a governing factor or baseline. This baseline ensures that the hard drive is not provisioned with a load so severe that it would be prevented from maintaining the established level of QoS.

Figure 4:
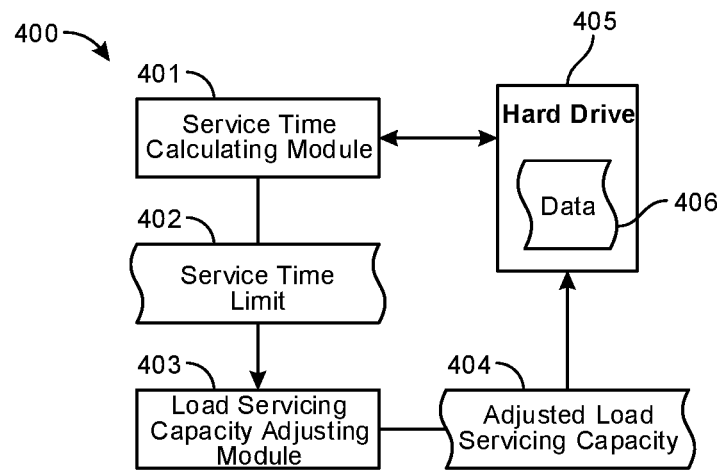
FIG. 4 illustrates a computing environment in which hard drive load servicing capacity is adjusted based on a specified service time limit.

FIG. 4 illustrates an embodiment of a computing environment 400 in which a service time calculating module 401 calculates a service time limit 402 that is to be maintained by the hard drive 405. In some cases, this service time limit is the same for all user connections, or may be different for different users or different types of users (e.g., users who pay for a superior QoS). The calculated service time limit 402 is then used by the load servicing capacity adjusting module 403 to dynamically adjust the amount of load servicing capacity on the hard drive 405 so that the hard drive maintains the identified service time limit 402.

Thus, for example, if the hard drive 405 is reading data 406 that is to be provisioned to a user's electronic device in a streaming media session, the service time calculating module 401 will calculate or otherwise determine a service time limit 402 that is to be maintained by the hard drive 405. The load servicing capacity adjusting module 403 accesses the hard drive 405 to determine whether the hard drive is maintaining the service time limit 402 and whether the hard drive has any excess load servicing capacity (i.e., an ability to service more load while still maintaining the service time limit 402). If the hard drive has excess load servicing capacity, the load servicing capacity adjusting module 403 will adjust the load servicing capacity 404 to increase the load serviced by the hard drive 405. Conversely, if the hard drive 405 is exceeding its load servicing capacity, the load servicing capacity adjusting module 403 will adjust the load servicing capacity 404 to decrease the load serviced by the hard drive 405. Using these dynamic load servicing adjustments, the load servicing capacity adjusting module 403 can operate the hard drive at maximum load servicing capacity while not exceeding that capacity by falling behind the service time limit 402.

In some embodiments, administrators may decide to limit the load servicing capacity of the hard drive 405 based on the calculated HDDCombined health factor (i.e., combined hard drive health factor 305). In such cases, scenarios may arise where the service time becomes the limiting hard drive health factor, before the hard drive 405 reaches the HDDCombined limit. This may happen, for instance, if the average read size is relatively large. Even though larger reads are more efficient for the disk (since the fraction of time spent seeking for the data 406 is reduced), increasing the read size also increases the service time, because the average time to complete each read is longer, and because queuing delays cause data reads to take longer. In some cases, this happens even though the service time is taken into account when calculating the effective seek time for the HDDCombined health factor because, in such cases, the actual average queue length differs from the value used in those calculations.

In some cases, the service time is not used as the primary limiting factor when determining how to adjust the load servicing capacity on the hard drive 405. Instead, at least in some embodiments, the primary limiting factor for determining how much or how often to adjust the load servicing capacity of the hard drive 405 is the calculated HDDCombined limit. In some cases, the HDDCombined limit may be reduced, so that the hard drive is less busy. This results in smaller average queue length, leading to shorter queueing delays and shorter service times. Rather than actually adjusting the HDDCombined limit value, the same effect may be obtained by calculating a separate health factor, referred to herein as a "scaled hard drive health factor" or "HDDScaled".

At least in some embodiments, HDDScaled is calculated as: HDDScaled=HDDCombined/hdd_combined_target. In this equation, HDDCombined is the combined hard drive health factor calculated above, and "hdd_combined_target" represents the estimated target value of HDDCombined. At that value, the estimated service time will equal a target value, set such that the service time does not become the limiting factor. At least in some embodiments, calculating hdd_combined_target includes implementing a queueing delay result which corresponds to the scenario of a streaming media server. As such, the embodiments described herein implement an empirical approach of gathering data for the average delay vs HDDCombined, and then fitting a function to the results. That function is then used to estimate hdd_combined_target for the HDDScaled equation above. For the HDDScaled health factor, a value of one corresponds (at least in this example) to the target service time (set to a value less than the service time limit). At least in some cases, either hdd_combined_target will be low enough to provide sufficient headroom, or else HDDCombined will be the limiting factor first, in which case its headroom applies.

Figure 5:
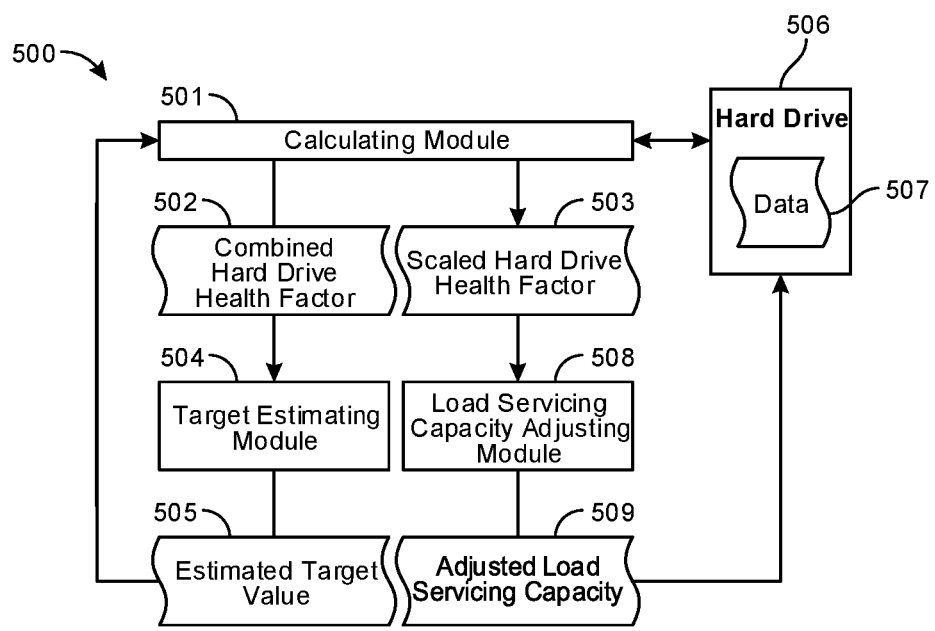
FIG. 5 illustrates a computing environment in which combined and scaled hard drive health factors are used to estimate and adjust hard drive load servicing capacity according to estimated target values.

FIG. 5 illustrates an example computing architecture 500 in which a calculating module 501 calculates a combined hard drive health factor 502 (e.g., HDDCombined). The target estimating module 504 of the example computing architecture 500 calculates an estimated target value (e.g., hdd_combined_target) that represents the estimated target value of HDDCombined. This estimated target value 505 is then used by the calculating module 501 to calculate the scaled hard drive health factor 503 (e.g., HDDScaled). The load servicing capacity adjusting module 508 then uses the scaled hard drive health factor 503 (which represents a scaled version of the HDDCombined health factor) to adjust the load servicing capacity 509. Thus, in the embodiment of FIG. 5, the scaled hard drive health factor 503 is used to adjust load servicing capacity on the hard drive 506, thereby governing how much data 507 is being read from or written to the hard drive at any given time. In some cases, the HDDCombined health factor may be used to adjust or regulate load servicing capacity, and in some cases, the HDDScaled health factor may be used to adjust load servicing capacity of a hard drive. In other cases, both alternative health factors (HDDCombined and HDDScaled) are used to regulate the load servicing capacity, because depending on the reading, writing, and data requesting conditions, either health factor may act as the limiting factor. Which alternative health factor will reach the established limit depends on whether the estimated service time at the HDDCombined limit value is more or less than the target service time.

In some cases, a user such as an administrator (e.g., 120 of FIG. 1) establishes the limits for the calculated combined hard drive health factor 502 and the calculated scaled hard drive health factor 503 through input 121 (e.g., a mouse and keyboard or touchscreen interface). The input 121 specifies, for example, a limit for the combined hard drive health factor 502 beyond which the load servicing capacity adjusting module 508 will adjust the load servicing capacity of the hard drive 506 downward to ensure that the hard drive stays below the established limit. Similarly, the input 121 may specify a limit for the scaled hard drive health factor 503, which takes target service time into consideration. The load servicing capacity adjusting module 508, as with the combined hard drive health factor 502, will begin to adjust the load servicing capacity of the hard drive 506 downward to ensure that the established limit for the scaled hard drive health factor 503 is not exceeded. In at least some embodiments, these established limits are dynamically changeable, either by the administrator 120 (or other user), or based on other factors such as triggering events. These triggering events may include input from the health monitoring PID indicating that load is to be reduced to preserve the life of the hard drive, or inputs from a network controller or network monitor indicating that the distribution network is backed up and cannot handle data transmissions above a certain specified amount. Or, the network monitor may indicate that network bandwidth has gone back up to normal levels. In such cases, the load servicing capacity adjusting module 508 will dynamically adjust the established limits for the health factors 502 and/or 503 to optimize hard drive performance in light of the current network and environmental conditions.

Figure 6:
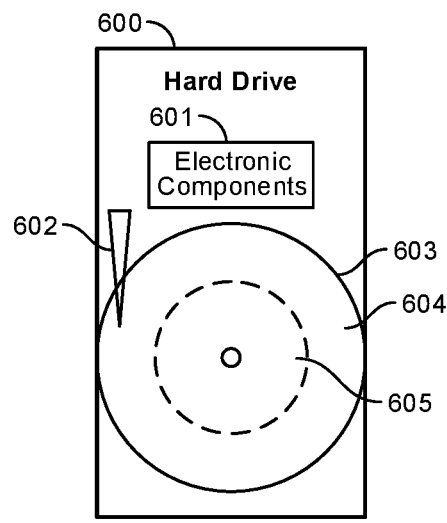
FIG. 6 illustrates an embodiment in which the average per-seek time and/or the average read time are derived according to where on the hard drive the data is stored.

As noted above, data stored on a hard drive is stored in specific locations on the hard drive. In some cases, the data is stored together in a continuous string of magnetic regions on the hard drive platter. In other cases, the data is broken up and stored in different locations on the disk, or is distributed over multiple disks (e.g., using a RAID pattern). As shown in FIG. 6, a hard drive 600 includes a read head 602 that reads data stored on a hard drive platter 603. In some cases, the data is stored on the inner portion 605 of the platter, and in other cases, the data is stored on the outer portion 604 of the platter 603. The electronic components 601 control the movements of the read head 602 to access the data stored on the hard drive. In some cases, the amount of load servicing capacity currently available at the hard drive 600 is dependent on or is determined based on the location of the stored data. Thus, if the data is stored on the inner portion 605 of the platter 603, the data will take slightly longer to access, as the linear speed of the disk is slower for the inner portion of the platter. Conversely, the data stored on the outer portion 604 of the platter 603 will be accessed more quickly, as the linear speed of the disk is faster on that region of the disk. Thus, if more popular data is stored on the outer portion 604 of the platter 603, the load servicing capacity adjusting module (e.g., 508 of FIG. 5) will be able to increase the load servicing capacity of the hard drive 600 as the data takes a shorter amount of time (on average) to access. Whereas, if the more popular data (e.g., the more heavily requested, more frequently accessed data) is stored on the inner portion 605 of the platter 603, the load servicing capacity adjusting module 508 will decrease the load servicing capacity of the hard drive 600 as the data takes longer to access.

In some embodiments, the systems described herein are configured to determine how much of the data stored on the hard drive 600 is served from the outer portion 604 of the drive and how much data of the data stored on the hard drive is served from the inner portion 605 of the hard drive. In some cases, this determination is made over time by monitoring where the read head 602 moves on the platter 603, or by measuring seek times or average read times. In some cases, data stored on the inner portion of the hard drive is moved to the outer portion of the hard drive upon determining that at least a portion of the data stored on the inner portion of the hard drive is being accessed more frequently than at least a portion of the data stored on the outer portion of the hard drive. Thus, if a portion of data is initially placed on the inner portion of the hard drive and that data is accessed more frequently than at least some of the data on the outer portion of the hard drive, that data may be moved to the outer portion of the hard drive. In this manner, the data that is accessed most frequently is maintained on the outer portion of the hard drive, which is accessed more quickly by the hard drive's read head.

In some cases, the systems described herein perform tests on hard drives of various types to determine, for each drive type or for each hard drive model, the average per-seek time, the average read time, and/or other metrics. In such tests, the location of the data stored on the platter 603 is known. Thus, the test metrics reflect, for each region (e.g., inner portion 605 or outer portion 604), the load servicing capacity of the hard drive (e.g., how fast the data is read, how much data is read, etc.). In some cases, it should be noted, the regions of the hard drive are at a much higher level of granularity. Instead of merely having two halves of a platter (e.g., 604 and 605), the hard drive platter 603 may be divided into substantially any number of different areas. In such cases, the hard drive metrics may indicate test data for each of the different regions. That test data is then used to determine how much of the data stored on the hard drive is being served from each region. In some cases, each different region has its own test metrics, resulting in potentially different hard drive health factors (e.g., 502 and/or 503 of FIG. 5).

Figure 7:
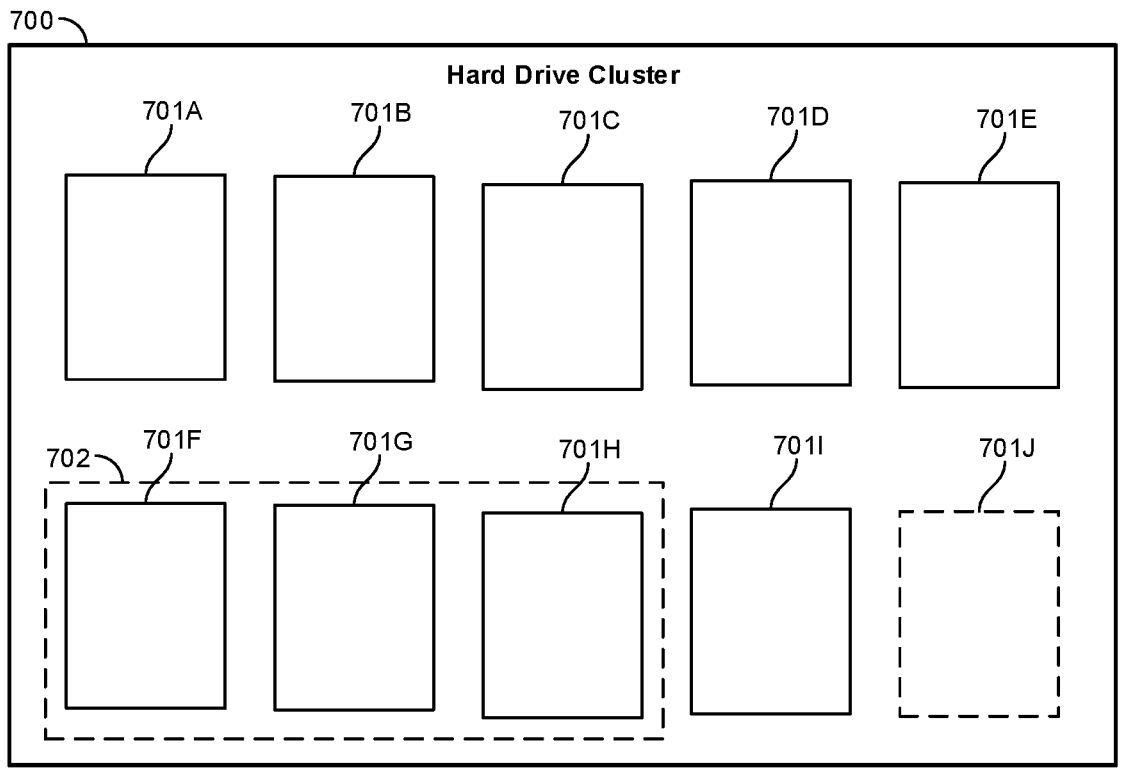
FIG. 7 illustrates an embodiment of a hard drive cluster in which hard drives are added or removed according to derived hard drive health factors.

FIG. 7 illustrates an embodiment in which at least one hard drive (e.g., 701A) is part of a cluster of hard drives (e.g., hard drive cluster 700) that is serving media content over a computer network. The hard drive cluster 700 may include substantially any number of hard drives that are located in the same physical location or are spread over multiple physical locations. Within a given hard drive cluster, some subset of the hard drives may make up a virtual cluster. For instance, in FIG. 7, hard drives 701F, 701G, and 701H are shown as being part of virtual hard drive cluster 702. The virtual hard drive cluster 702 may also include substantially any number of hard drives, and may be changed dynamically to include more or fewer hard drives. The hard drive cluster 700 (which includes all or a portion of the hard drives 701A-701J) is configured to serve data including, potentially, multimedia content over a computer network such as the internet. The hard drive cluster 700 is configured to receive and handle multiple simultaneous data read requests from many hundreds, thousands, or millions of different users or media playback sessions.

In some cases, the amount of load servicing capacity determined to be currently available at one of the hard drives in the hard drive cluster 700 indicates whether other hard drives should be added to or removed from the cluster of hard drives. Indeed, as noted above, hard drives may be physically added to or removed from the hard drive cluster. Additionally or alternatively, hard drives may be virtually added to or removed from any virtual clusters (e.g., 702) that may be established to serve a subset of client requests. In some embodiments, if the limit established for the combined hard drive health factor 502 is exceeded, or if the established limit for the scaled hard drive health factor 503 is exceeded, then, at least in some cases, additional hard drives are physically added to the hard drive cluster 700 (or additional hard drives are virtually added to the virtual hard drive cluster 702.

In other cases, if the limit established for the combined hard drive health factor 502 is below an established threshold number, or if the established limit for the scaled hard drive health factor 503 is below an established threshold number, then, in such cases, hard drives are physically removed from the hard drive cluster 700 (or hard drives are virtually removed from the virtual hard drive cluster 702). Thus, the load servicing capacity adjusting module 508 may not only adjust the amount of load serviced by any given hard drive, but may also cause additional drives to be added to or removed from a hard drive cluster to assist when hard drives are overloaded or have extra load servicing capacity. In some cases, hard drives are added to or removed from the hard drive cluster 700 in order to maintain a specified service time limit. Thus, for instance, if a service time limit has been established in which media content is to be provided to a user's electronic device, the load servicing capacity adjusting module 508 then adds hard drives to the hard drive cluster 700 as necessary to maintain the service time limit. In cases where peak demand subsides, and the data request demand can be met with fewer hard drives, the load servicing capacity adjusting module 508 then causes those hard drives to be removed from the hard drive cluster or perhaps assigned to another virtual hard drive cluster.

Accordingly, in this manner, the systems described herein are configured to regulate the load servicing capacity of any given hard drive or hard drive cluster according to alternative hard drive health factors. These alternative health factors, including a combined hard drive health factor and a scaled hard drive health factor, provide additional insights beyond traditional health factors that provide a much more accurate picture of how much additional load servicing capacity those hard drives actually have. By taking into account the data's location on disk, and by taking into account a service time limit, the embodiments herein ensure that each hard drive or hard drive cluster is operating at maximum capacity, while still maintaining the service time limit. This ensures that data providers are receiving optimal output from their hard drives while still providing a high-quality streaming experience for the user.

Example Embodiments

1. A computer-implemented method comprising: accessing at least one hard drive to measure one or more operational characteristics of the hard drive, deriving one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data, determining, based on the derived hard drive health factors and the measured operational characteristics, an amount of load servicing capacity currently available at the hard drive, and regulating the amount of load servicing performed by the hard drive according to the determined amount of available load servicing capacity.

2. The computer-implemented method of claim 1, wherein the operational characteristics of the hard drive comprise at least one of input/output operations per second (IOPS) read from the hard drive or megabytes per second (MBPS) read from the hard drive.

3. The computer-implemented method of claim 1, wherein determining, based on the derived hard drive health factors and the measured operational characteristics, an amount of load servicing capacity currently available at the hard drive further comprises calculating a combined hard drive health factor that comprises the product of the IOPS and the average per-seek time added to the MBPS read divided by the average read speed.

4. The computer-implemented method of claim 1, wherein determining, based on the derived hard drive health factors and the measured operational characteristics, an amount of load servicing capacity currently available at the hard drive further includes: identifying a service time limit that is to be maintained by the hard drive, and dynamically adjusting the determined amount of load servicing capacity to maintain the identified service time limit.

5. The computer-implemented method of claim 4, wherein determining, based on the derived hard drive health factors and the measured operational characteristics, an amount of load servicing capacity currently available at the hard drive further comprises: calculating a combined hard drive health factor that comprises the product of the IOPS and the average per-seek time added to the MBPS read divided by the average read speed, estimating a target value for the combined hard drive health factor, and calculating a scaled hard drive health factor that divides the combined hard drive health factor by the estimated target value for the first combined hard drive health factor.

6. The computer-implemented method of claim 5, wherein regulating the amount of load servicing performed by the hard drive according to the determined amount of available load servicing capacity further includes regulating the amount of load servicing performed by the hard drive according to the calculated scaled hard drive health factor.

7. The computer-implemented method of claim 5, further comprising establishing respective limits for the calculated combined hard drive health factor and the calculated scaled hard drive health factor.

8. The computer-implemented method of claim 7, wherein the respective limits for the calculated combined hard drive health factor and the calculated scaled hard drive health factor comprise dynamic limits subject to change based on one or more factors.

9. The computer-implemented method of claim 1, wherein data stored on the hard drive is stored in specified locations on the hard drive, and wherein the amount of load servicing capacity currently available at the hard drive is further determined based on the location of the stored data.

10. The computer-implemented method of claim 9, wherein more frequently accessed data is stored on an outer portion of the hard drive, and wherein less frequently accessed data is stored on an inner portion of the hard drive.

11. The computer-implemented method of claim 10, further comprising determining how much data stored on the hard drive is served from the outer portion of the drive and determining how much data stored on the hard drive is served from the inner portion of the drive.

12. The computer-implemented method of claim 10, wherein data stored on the inner portion of the hard drive is moved to the outer portion of the hard drive upon determining that at least a portion of the data stored on the inner portion of the hard drive is being accessed more frequently than at least a portion of the data stored on the outer portion of the hard drive.

13. The computer-implemented method of claim 9, wherein at least one of the average per-seek time or the average read time are further derived according to where on the hard drive the specified data is stored.

14. A system comprising: at least one physical processor, and physical memory comprising computer-executable instructions that, when executed by the physical processor, cause the physical processor to: access at least one hard drive to measure one or more operational characteristics of the hard drive, derive one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data, determine, based on the derived hard drive health factors and the measured operational characteristics, an amount of load servicing capacity currently available at the hard drive, and regulate the amount of load servicing performed by the hard drive according to the determined amount of available load servicing capacity.

15. The system of claim 14, wherein the at least one hard drive is part of a cluster of hard drives serving media content over a computer network.

16. The system of claim 15, wherein the cluster of hard drives serving media content over the computer network is configured to receive and handle multiple simultaneous data read requests.

17. The system of claim 15, wherein the determined amount of load servicing capacity currently available at the hard drive indicates whether one or more hard drives should be added to or removed from the cluster of hard drives.

18. The system of claim 17, wherein the cluster of hard drives comprises a virtual cluster of hard drives that allows a variable number of hard drives to be operational at a given time, and wherein one or more hard drives are automatically removed from or added to the virtual cluster according to the indication of whether the one or more hard drives should be added to or removed from the virtual cluster of hard drives.

19. The system of claim 17, wherein the one or more hard drives are added to or removed from the cluster of hard drives in order to maintain a specified service time limit.

20. A non-transitory computer-readable medium comprising one or more computer-executable instructions that, when executed by at least one processor of a computing device, cause the computing device to: access at least one hard drive to measure one or more operational characteristics of the hard drive, derive one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data, determine, based on the derived hard drive health factors and the measured operational characteristics, an amount of load servicing capacity currently available at the hard drive, and regulate the amount of load servicing performed by the hard drive according to the determined amount of available load servicing capacity.

Figure 8:
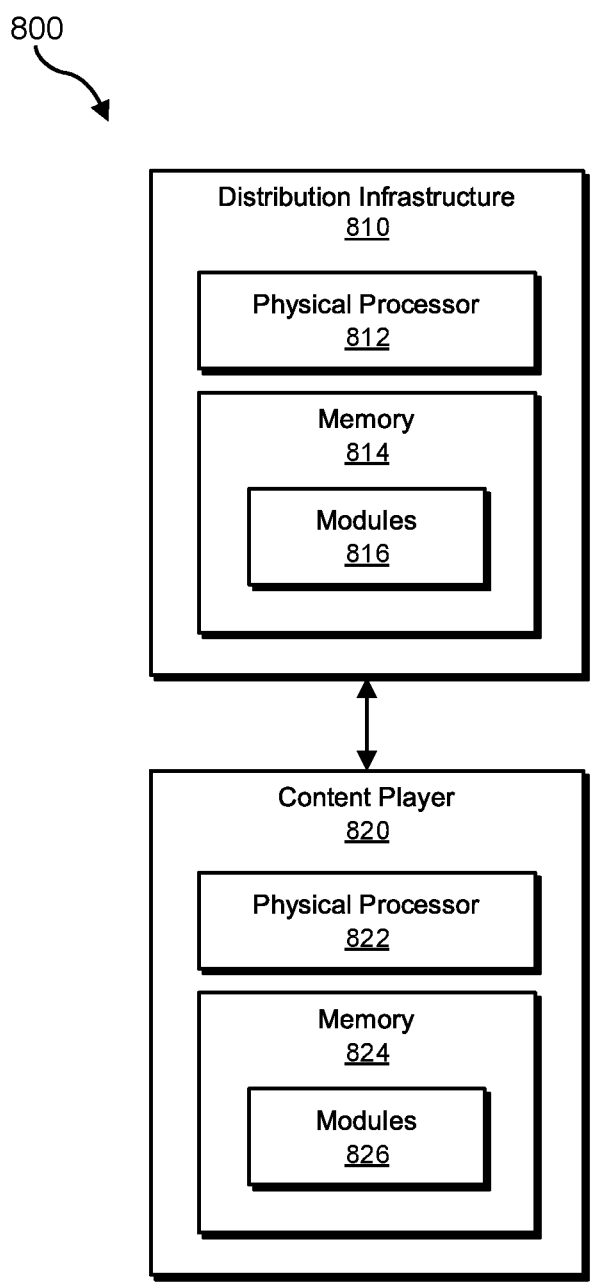
FIG. 8 is a block diagram of an exemplary content distribution ecosystem.
Figure 10:
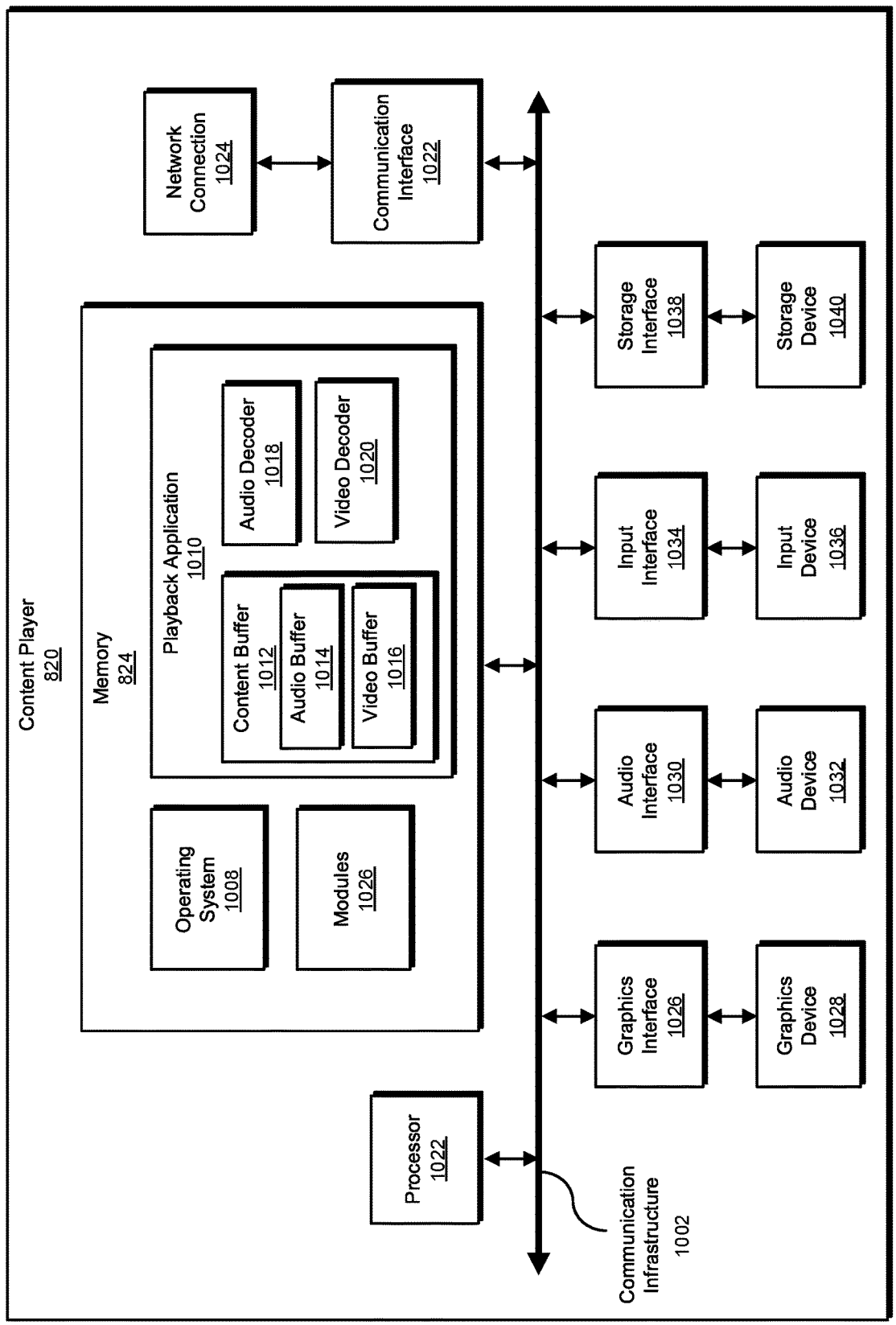
FIG. 10 is a block diagram of an exemplary content player within the content distribution ecosystem shown in FIG. 8.

The following will provide, with reference to FIG. 8, detailed descriptions of exemplary ecosystems in which content is provisioned to end nodes and in which requests for content are steered to specific end nodes. The discussion corresponding to FIGS. 10 and 11 presents an overview of an exemplary distribution infrastructure and an exemplary content player used during playback sessions, respectively. These exemplary ecosystems and distribution infrastructures are implemented in any of the embodiments described above with reference to FIGS. 1-7.

FIG. 8 is a block diagram of a content distribution ecosystem 800 that includes a distribution infrastructure 810 in communication with a content player 820. In some embodiments, distribution infrastructure 810 is configured to encode data at a specific data rate and to transfer the encoded data to content player 820. Content player 820 is configured to receive the encoded data via distribution infrastructure 810 and to decode the data for playback to a user. The data provided by distribution infrastructure 810 includes, for example, audio, video, text, images, animations, interactive content, haptic data, virtual or augmented reality data, location data, gaming data, or any other type of data that is provided via streaming.

Distribution infrastructure 810 generally represents any services, hardware, software, or other infrastructure components configured to deliver content to end users. For example, distribution infrastructure 810 includes content aggregation systems, media transcoding and packaging services, network components, and/or a variety of other types of hardware and software. In some cases, distribution infrastructure 810 is implemented as a highly complex distribution system, a single media server or device, or anything in between. In some examples, regardless of size or complexity, distribution infrastructure 810 includes at least one physical processor 812 and at least one memory device 814. One or more modules 816 are stored or loaded into memory 814 to enable the various functionalities discussed herein.

Content player 820 generally represents any type or form of device or system capable of playing audio and/or video content that has been provided over distribution infrastructure 810. Examples of content player 820 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 810, content player 820 includes a physical processor 822, memory 824, and one or more modules 826. Some or all of the processes described herein are performed or enabled by modules 816 and/or by modules 826, and in some examples, modules 816 of distribution infrastructure 810 coordinate with modules 826 of content player 820 to provide at least some of the functionality described herein.

In certain embodiments, one or more of modules 816 and/or 826 in FIG. 8 represent one or more software applications or programs that, when executed by a computing device, cause the computing device to perform one or more tasks. For example, and as will be described in greater detail below, one or more of modules 816 and 826 represent modules stored and configured to run on one or more general-purpose computing devices. One or more of modules 816 and 826 in FIG. 8 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 812 and 822 generally represent any type or form of hardware-implemented processing unit capable of interpreting and/or executing computer-readable instructions. In one example, physical processors 812 and 822 access and/or modify one or more of modules 816 and 826, respectively. Additionally or alternatively, physical processors 812 and 822 execute one or more of modules 816 and 826 to facilitate adaptive streaming of multimedia content. Examples of physical processors 812 and 822 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 814 and 824 generally represent any type or form of volatile or non-volatile storage device or medium capable of storing data and/or computer-readable instructions. In one example, memory 814 and/or 824 stores, loads, and/or maintains one or more of modules 816 and 826. Examples of memory 814 and/or 824 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 9:
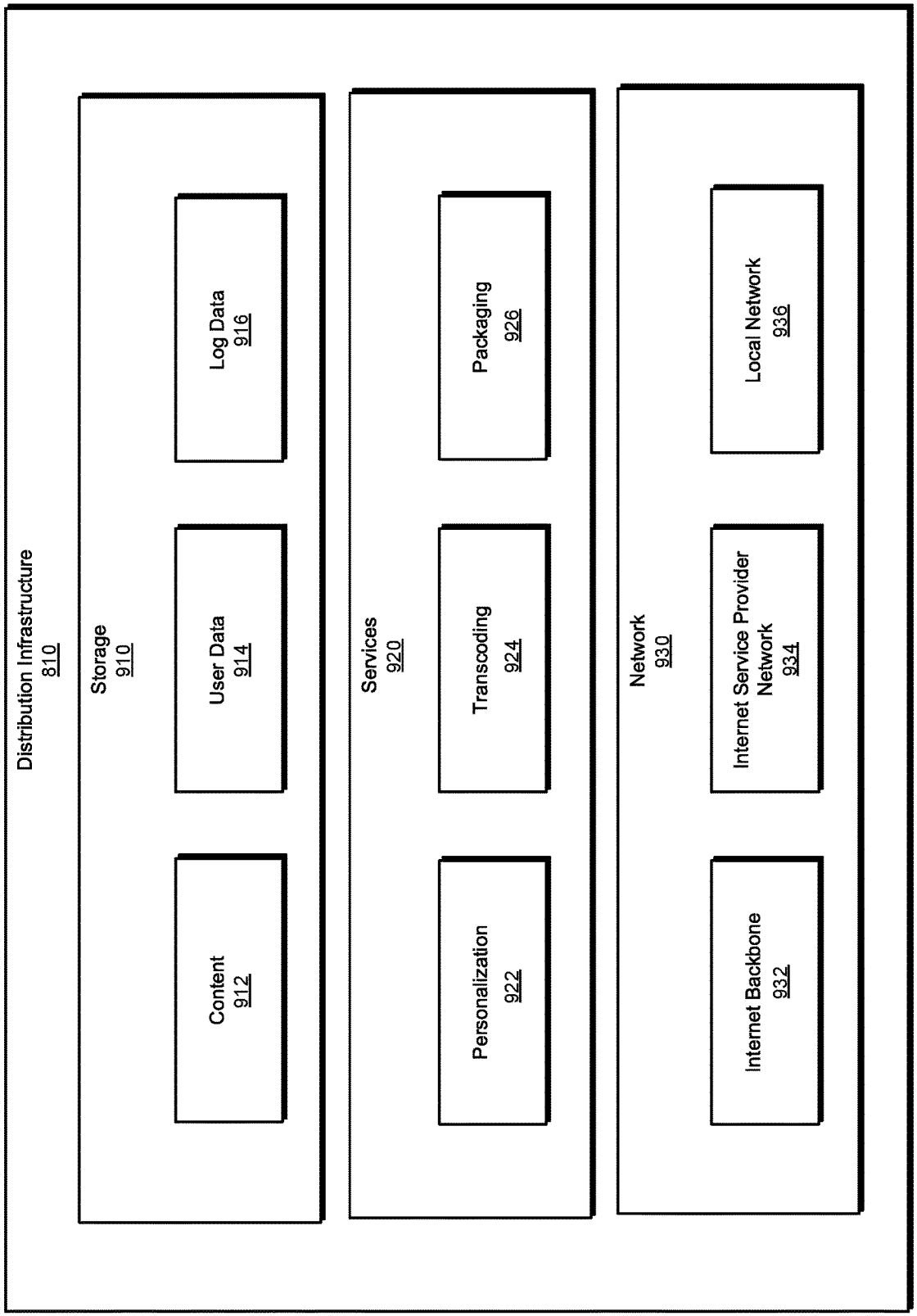
FIG. 9 is a block diagram of an exemplary distribution infrastructure within the content distribution ecosystem shown in FIG. 8.

FIG. 9 is a block diagram of exemplary components of content distribution infrastructure 810 according to certain embodiments. Distribution infrastructure 810 includes storage 910, services 920, and a network 930. Storage 910 generally represents any device, set of devices, and/or systems capable of storing content for delivery to end users. Storage 910 includes a central repository with devices capable of storing terabytes or petabytes of data and/or includes distributed storage systems (e.g., appliances that mirror or cache content at Internet interconnect locations to provide faster access to the mirrored content within certain regions). Storage 910 is also configured in any other suitable manner.

As shown, storage 910 may store a variety of different items including content 912, user data 914, and/or log data 916. Content 912 includes television shows, movies, video games, user-generated content, and/or any other suitable type or form of content. User data 914 includes personally identifiable information (PII), payment information, preference settings, language and accessibility settings, and/or any other information associated with a particular user or content player. Log data 916 includes viewing history information, network throughput information, and/or any other metrics associated with a user's connection to or interactions with distribution infrastructure 810.

Services 920 includes personalization services 922, transcoding services 924, and/or packaging services 926. Personalization services 922 personalize recommendations, content streams, and/or other aspects of a user's experience with distribution infrastructure 810. Encoding services 924 compress media at different bitrates, which enable real-time switching between different encodings. Packaging services 926 package encoded video before deploying it to a delivery network, such as network 930, for streaming.

Network 930 generally represents any medium or architecture capable of facilitating communication or data transfer. Network 930 facilitates communication or data transfer using wireless and/or wired connections. Examples of network 930 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 9, network 930 includes an Internet backbone 932, an internet service provider 934, and/or a local network 936.

FIG. 10 is a block diagram of an exemplary implementation of content player 820 of FIG. 8. Content player 820 generally represents any type or form of computing device capable of reading computer-executable instructions. Content player 820 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 10, in addition to processor 822 and memory 824, content player 820 includes a communication infrastructure 1002 and a communication interface 1022 coupled to a network connection 1024. Content player 820 also includes a graphics interface 1026 coupled to a graphics device 1028, an input interface 1034 coupled to an input device 1036, and a storage interface 1038 coupled to a storage device 1040.

Communication infrastructure 1002 generally represents any type or form of infrastructure capable of facilitating communication between one or more components of a computing device. Examples of communication infrastructure 1002 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 824 generally represents any type or form of volatile or non-volatile storage device or medium capable of storing data and/or other computer-readable instructions. In some examples, memory 824 stores and/or loads an operating system 1008 for execution by processor 822. In one example, operating system 1008 includes and/or represents software that manages computer hardware and software resources and/or provides common services to computer programs and/or applications on content player 820.

Operating system 1008 performs various system management functions, such as managing hardware components (e.g., graphics interface 1026, audio interface 1030, input interface 1034, and/or storage interface 1038). Operating system 1008 also provides process and memory management models for playback application 1010. The modules of playback application 1010 includes, for example, a content buffer 1012, an audio decoder 1018, and a video decoder 1020.

Playback application 1010 is configured to retrieve digital content via communication interface 1022 and play the digital content through graphics interface 1026. Graphics interface 1026 is configured to transmit a rendered video signal to graphics device 1028. In normal operation, playback application 1010 receives a request from a user to play a specific title or specific content. Playback application 1010 then identifies one or more encoded video and audio streams associated with the requested title. After playback application 1010 has located the encoded streams associated with the requested title, playback application 1010 downloads sequence header indices associated with each encoded stream associated with the requested title from distribution infrastructure 810. A sequence header index associated with encoded content includes information related to the encoded sequence of data included in the encoded content.

In one embodiment, playback application 1010 begins downloading the content associated with the requested title by downloading sequence data encoded to the lowest audio and/or video playback bitrates to minimize startup time for playback. The requested digital content file is then downloaded into content buffer 1012, which is configured to serve as a first-in, first-out queue. In one embodiment, each unit of downloaded data includes a unit of video data or a unit of audio data. As units of video data associated with the requested digital content file are downloaded to the content player 820, the units of video data are pushed into the content buffer 1012. Similarly, as units of audio data associated with the requested digital content file are downloaded to the content player 820, the units of audio data are pushed into the content buffer 1012. In one embodiment, the units of video data are stored in video buffer 1016 within content buffer 1012 and the units of audio data are stored in audio buffer 1014 of content buffer 1012.

A video decoder 1020 reads units of video data from video buffer 1016 and outputs the units of video data in a sequence of video frames corresponding in duration to the fixed span of playback time. Reading a unit of video data from video buffer 1016 effectively de-queues the unit of video data from video buffer 1016. The sequence of video frames is then rendered by graphics interface 1026 and transmitted to graphics device 1028 to be displayed to a user.

An audio decoder 1018 reads units of audio data from audio buffer 1014 and output the units of audio data as a sequence of audio samples, generally synchronized in time with a sequence of decoded video frames. In one embodiment, the sequence of audio samples is transmitted to audio interface 1030, which converts the sequence of audio samples into an electrical audio signal. The electrical audio signal is then transmitted to a speaker of audio device 1032, which, in response, generates an acoustic output.

In situations where the bandwidth of distribution infrastructure 810 is limited and/or variable, playback application 1010 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 1026 is configured to generate frames of video data and transmit the frames of video data to graphics device 1028. In one embodiment, graphics interface 1026 is included as part of an integrated circuit, along with processor 822. Alternatively, graphics interface 1026 is configured as a hardware accelerator that is distinct from (i.e., is not integrated within) a chipset that includes processor 822.

Graphics interface 1026 generally represents any type or form of device configured to forward images for display on graphics device 1028. For example, graphics device 1028 is fabricated using liquid crystal display (LCD) technology, cathode-ray technology, and light-emitting diode (LED) display technology (either organic or inorganic). In some embodiments, graphics device 1028 also includes a virtual reality display and/or an augmented reality display. Graphics device 1028 includes any technically feasible means for generating an image for display. In other words, graphics device 1028 generally represents any type or form of device capable of visually displaying information forwarded by graphics interface 1026.

As illustrated in FIG. 10, content player 820 also includes at least one input device 1036 coupled to communication infrastructure 1002 via input interface 1034. Input device 1036 generally represents any type or form of computing device capable of providing input, either computer or human generated, to content player 820. Examples of input device 1036 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 820 also includes a storage device 1040 coupled to communication infrastructure 1002 via a storage interface 1038. Storage device 1040 generally represents any type or form of storage device or medium capable of storing data and/or other computer-readable instructions. For example, storage device 1040 is a magnetic disk drive, a solid-state drive, an optical disk drive, a flash drive, or the like. Storage interface 1038 generally represents any type or form of interface or device for transferring data between storage device 1040 and other components of content player 820

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to determine hard drive health factors, use the result of the transformation to control the hard drive, and store the result of the transformation to track how the hard drive was controlled. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   accessing at least one hard drive to measure one or more operational characteristics of the hard drive;
   deriving one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data;
   determining, based on the derived hard drive health factors and the measured operational characteristics, an amount of load servicing capacity currently available at the hard drive including identifying:
   a service time limit comprising a maximum amount of time between receiving a read request and servicing the read request; and
   a number of read requests that can currently be reordered into a read order that is based on the specified data's location on disk; and
   regulating the amount of load servicing performed by the hard drive according to the determined amount of available load servicing capacity and according to the number of currently reorderable read requests, the regulating including dynamically adjusting the determined amount of load servicing capacity to uphold the identified service time limit.

2. The computer-implemented method of claim 1, wherein the operational characteristics of the hard drive comprise at least one of input/output operations per second (IOPS) read from the hard drive or megabytes per second (MBPS) read from the hard drive.

3. The computer-implemented method of claim 1, wherein determining, based on the derived hard drive health factors and the measured operational characteristics, an amount of load servicing capacity currently available at the hard drive further comprises calculating a combined hard drive health factor that comprises a product of the IOPS and the average per-seek time added to the MBPS read divided by the average read speed.

4. The computer-implemented method of claim 1, wherein determining, based on the derived hard drive health factors and the measured operational characteristics, an amount of load servicing capacity currently available at the hard drive further comprises:
   calculating a combined hard drive health factor that comprises a product of the IOPS and the average per-seek time added to the MBPS read divided by the average read speed;
   estimating a target value for the combined hard drive health factor; and
   calculating a scaled hard drive health factor that divides the combined hard drive health factor by the estimated target value for the first combined hard drive health factor.

5. The computer-implemented method of claim 4, wherein regulating the amount of load servicing performed by the hard drive according to the determined amount of available load servicing capacity further includes regulating the amount of load servicing performed by the hard drive according to the calculated scaled hard drive health factor.

6. The computer-implemented method of claim 4, further comprising establishing respective limits for the calculated combined hard drive health factor and the calculated scaled hard drive health factor.

7. The computer-implemented method of claim 6, wherein the respective limits for the calculated combined hard drive health factor and the calculated scaled hard drive health factor comprise dynamic limits subject to change based on one or more factors.

8. The computer-implemented method of claim 1, wherein data stored on the hard drive is stored in specified locations on the hard drive, and wherein the amount of load servicing capacity currently available at the hard drive is further determined based on the location of the stored data.

9. The computer-implemented method of claim 8, wherein more frequently accessed data is stored on an outer portion of the hard drive, and wherein less frequently accessed data is stored on an inner portion of the hard drive.

10. The computer-implemented method of claim 9, further comprising determining how much data stored on the hard drive is served from the outer portion of the drive and determining how much data stored on the hard drive is served from the inner portion of the drive.

11. The computer-implemented method of claim 9, wherein data stored on the inner portion of the hard drive is moved to the outer portion of the hard drive upon determining that at least a portion of the data stored on the inner portion of the hard drive is being accessed more frequently than at least a portion of the data stored on the outer portion of the hard drive.

12. The computer-implemented method of claim 8, wherein at least one of the average per-seek time or the average read speed is further derived according to where on the hard drive the specified data is stored.

13. A system comprising:
at least one physical processor; and
physical memory comprising computer-executable instructions that, when executed by the physical processor, cause the physical processor to:
access at least one hard drive to measure one or more operational characteristics of the hard drive;
derive one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data;
determine, based on the derived hard drive health factors and the measured operational characteristics, an amount of load servicing capacity currently available at the hard drive including identifying:
a service time limit comprising a maximum amount of time between receiving a read request and servicing the read request; and
a number of read requests that can currently be reordered into a read order that is based on the specified data's location on disk; and
regulate the amount of load servicing performed by the hard drive according to the determined amount of available load servicing capacity and according to the number of currently reorderable read requests, the regulating including dynamically adjusting the determined amount of load servicing capacity to uphold the identified service time limit.

14. The system of claim 13, wherein the at least one hard drive is part of a cluster of hard drives serving media content over a computer network.

15. The system of claim 14, wherein the cluster of hard drives serving media content over the computer network is configured to receive and handle multiple simultaneous data read requests.

16. The system of claim 14, wherein the determined amount of load servicing capacity currently available at the hard drive indicates whether one or more hard drives should be added to or removed from the cluster of hard drives.

17. The system of claim 16, wherein the cluster of hard drives comprises a virtual cluster of hard drives that allows a variable number of hard drives to be operational at a given time, and wherein one or more hard drives are automatically removed from or added to the virtual cluster according to the indication of whether the one or more hard drives should be added to or removed from the virtual cluster of hard drives.

18. The system of claim 16, wherein the one or more hard drives are added to or removed from the cluster of hard drives in order to maintain a specified service time limit.

19. A non-transitory computer-readable medium comprising one or more computer-executable instructions that, when executed by at least one processor of a computing device, cause the computing device to:
access at least one hard drive to measure one or more operational characteristics of the hard drive;
derive one or more hard drive health factors used to control the hard drive that are based on the measured operational characteristics, the one or more derived hard drive health factors including an average per-seek time indicating an average amount of time the hard drive spends seeking specified data that is to be read and an average read speed indicating an average amount of time the hard drive spends reading the specified data;
determine, based on the derived hard drive health factors and the measured operational characteristics, an amount of load servicing capacity currently available at the hard drive including identifying:
a service time limit comprising a maximum amount of time between receiving a read request and servicing the read request; and
a number of read requests that can currently be reordered into a read order that is based on the specified data's location on disk; and
regulate the amount of load servicing performed by the hard drive according to the determined amount of available load servicing capacity and according to the number of currently reorderable read requests, the regulating including dynamically adjusting the determined amount of load servicing capacity to uphold the identified service time limit.

20. The non-transitory computer-readable medium of claim 19, wherein determining, based on the derived hard drive health factors and the measured operational characteristics, an amount of load servicing capacity currently available at the hard drive further comprises calculating a combined hard drive health factor that comprises a product of the IOPS and the average per-seek time added to the MBPS read divided by the average read speed.

* * * * *